(No Model.)
J. H. BOWLEY.
APPARATUS FOR ROTATING EGG CONTAINING CASES.
No. 508,806. Patented Nov. 14, 1893.
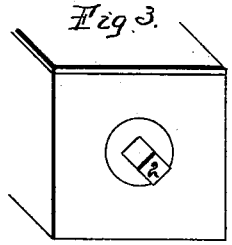
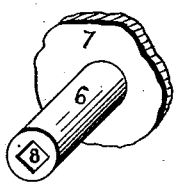
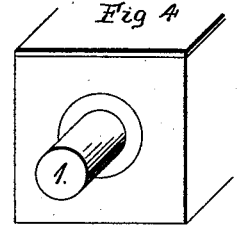
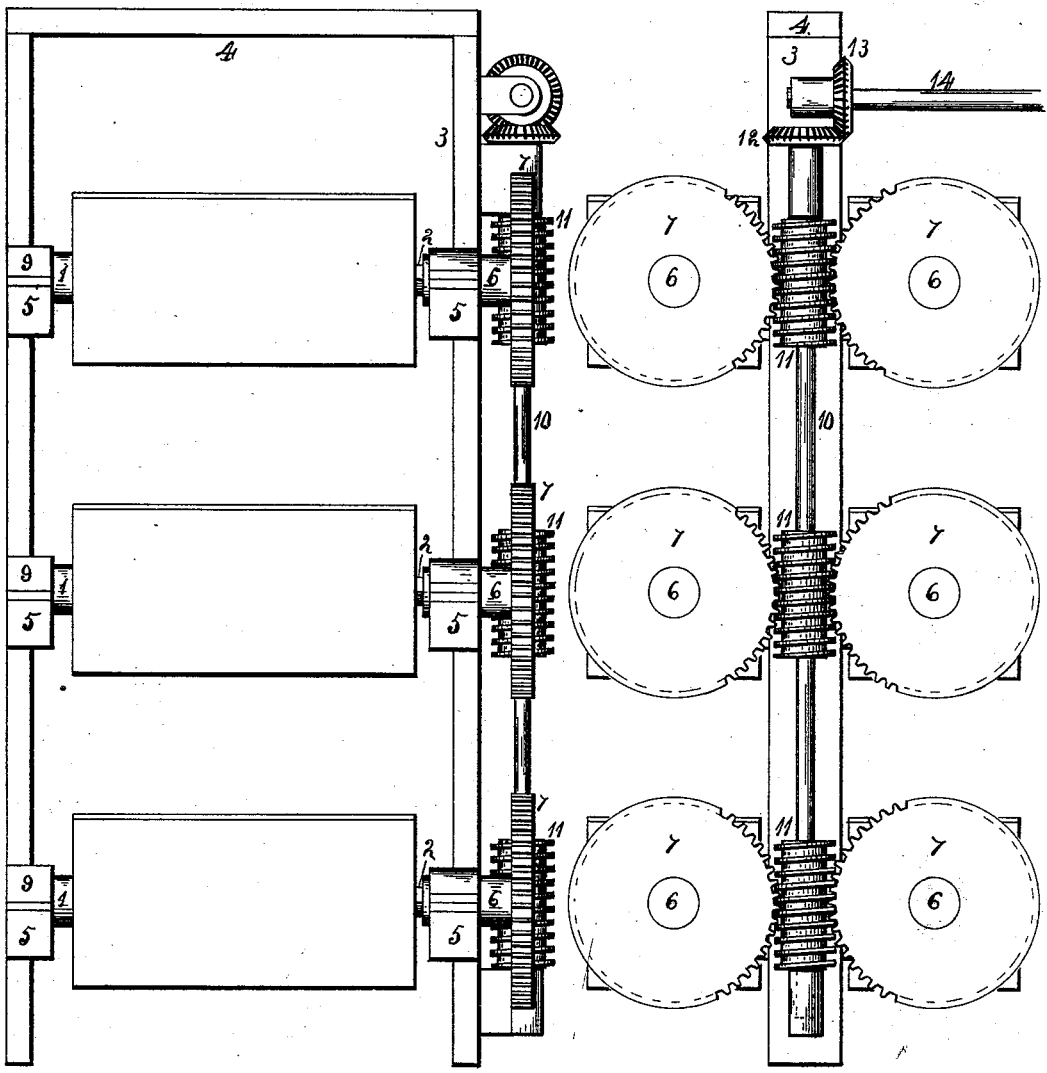

UNITED STATES PATENT OFFICE.

JOSEPH H. BOWLEY, OF MARENGO, ILLINOIS, ASSIGNOR OF ONE-HALF TO JOHN W. STOCKWELL, OF SAME PLACE.

APPARATUS FOR ROTATING EGG-CONTAINING CASES.

SPECIFICATION forming part of Letters Patent No. 508,806, dated November 14, 1893.

Application filed June 26, 1893. Serial No. 478,869. (No model.)

*To all whom it may concern:*

Be it known that I, JOSEPH H. BOWLEY, a citizen of the United States, residing at Marengo, in the county of McHenry and State of Illinois, have invented certain new and useful Improvements in Apparatus for Rotating Egg-Containing Cases, of which the following is a specification.

The object of this invention is to construct an egg case with trunnions on each end, the end of one of the trunnions being sided, and to construct a frame work supporting rotating shafts provided with a socket corresponding in shape with the sided end of the trunnion, and an open sided bearing for the other trunnion, and means for imparting an intermittent rotary movement to the shafts and consequently to the case.

In the accompanying drawings, Figure 1, is a side elevation of my improvements. Fig. 2, is an end elevation. Figs. 3, and 4, are isometrical representations of the trunnions of the egg case. Figs. 5 and 6, are isometrical representations of the bearing supports for the egg case.

The egg containing case is of any suitable construction, in this instance of rectangular form, provided with a round trunnion 1, extending from one end and a sided trunnion 2, extending from the other end. A frame is composed of the uprights 3, connected by a top cross bar 4. To the inner faces of this upright are secured transverse bars 5. A series of shafts 6, are supported upon the upper face of the transverse bars at one end of the frame each having a gear wheel 7, connected to its outer end. The inner ends of these shafts are provided with recesses 8, corresponding to the sided end of the trunnion.

The transverse bars secured to the uprights, support semicircular bearings 9, on their upper faces in line with the shafts 6. A vertical shaft 10, lies between the two rows of gear wheels 7, and worms 11, are secured to said shaft so that they engage the teeth of the gear wheels on opposite sides. The upper end of this shaft supports a beveled gear wheel 12, which meshes with the teeth of a beveled gear wheel 13, secured to the line shafting 14.

In the storage of eggs it is necessary that they be turned end for end in order to prevent settling, and this has heretofore been accomplished by taking the eggs from one case and placing them in another case by hand. By my arrangement the eggs are carefully placed in the case, the case being placed in position in the frame by first inserting the sided end of the trunnion into the socket of the shaft, and then lowering the other trunnion into the semi-circular socket, in such position that the eggs will stand on end. After the frame has been filled or as many cases placed in position as is desired a rotary motion is imparted to the line shaft by being connected to a suitable prime mover, and the required number of turns given thereto to rotate the case bottom side up when the parts are left in this position until another turning is necessary. Any one case can be placed in position or removed without disturbing the others. By this arrangement all the eggs in a case or series of cases can be turned by a single operation.

I claim as my invention—

In an apparatus for rotating egg-containing cases, the combination of a suitable frame supporting a series of shafts, and semi circular bearings, the shafts being provided with angular sockets, a series of egg cases provided with trunnions, one of which fits the sockets and the other the semi-circular bearings, a vertical shaft having a connection with a series of shafts and a horizontal line shaft imparting motion to the vertical shaft.

JOSEPH H. BOWLEY.

Witnesses:
 A. O. BEHEL,
 E. BEHEL.